(12) United States Patent
Holland

(10) Patent No.: US 9,080,911 B2
(45) Date of Patent: Jul. 14, 2015

(54) BOOST CONVERTER FOR TRACKING INPUT VOLTAGES

(75) Inventor: Eric J. Holland, Lake Crystal, MN (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 294 days.

(21) Appl. No.: 13/558,742

(22) Filed: Jul. 26, 2012

(65) Prior Publication Data

US 2014/0027188 A1 Jan. 30, 2014

(51) Int. Cl.

| G01G 23/36 | (2006.01) |
|---|---|
| H02M 3/156 | (2006.01) |
| G05F 1/10 | (2006.01) |
| G01G 23/00 | (2006.01) |
| G01G 23/18 | (2006.01) |
| H05B 33/08 | (2006.01) |
| G01G 23/01 | (2006.01) |
| H02M 1/00 | (2007.01) |

(52) U.S. Cl.
CPC ............... *G01G 23/007* (2013.01); *G01G 23/01* (2013.01); *G01G 23/18* (2013.01); *G01G 23/36* (2013.01); *G05F 1/10* (2013.01); *H02M 3/156* (2013.01); *H05B 33/0815* (2013.01); *H05B 33/0851* (2013.01); *H02M 2001/0025* (2013.01)

(58) Field of Classification Search
CPC ............. H02M 3/156; H02M 2001/0025; H05B 33/0815; H05B 33/0818; H05B 33/08515; G01F 1/10; G01G 23/007; G01G 23/18; G01G 23/36
USPC ......... 323/222, 223, 224, 234, 282–284, 351; 177/177; 326/78; 315/129, 209 R, 291, 315/299, 307, 308
See application file for complete search history.

(56) References Cited

U.S. PATENT DOCUMENTS

| 4,524,317 A * | 6/1985 | Millard .................... 323/224 |
|---|---|---|
| 5,587,916 A * | 12/1996 | Martinson et al. ........ 323/224 |
| 5,721,483 A * | 2/1998 | Kolluri et al. ............. 323/224 |
| 5,831,418 A * | 11/1998 | Kitagawa .................. 323/222 |
| 5,939,866 A * | 8/1999 | Bjorkengren ............. 323/222 |
| 6,011,382 A * | 1/2000 | Littlefield et al. ........ 323/222 |
| 6,051,935 A * | 4/2000 | Bucks et al. .............. 315/224 |
| 6,265,854 B1 * | 7/2001 | Neuteboom ............... 323/222 |
| 6,373,479 B1 * | 4/2002 | Moon ....................... 345/211 |
| 6,825,644 B2 * | 11/2004 | Kernahan et al. ......... 323/283 |
| 6,891,355 B2 * | 5/2005 | Kernahan .................. 323/282 |
| 7,053,591 B2 * | 5/2006 | Amrani et al. ............ 323/222 |
| 7,402,962 B1 * | 7/2008 | Fong ......................... 315/299 |
| 7,425,803 B2 * | 9/2008 | Shao et al. ................ 315/308 |
| 8,324,825 B2 * | 12/2012 | Shao et al. ................ 315/291 |
| 2003/0117088 A1 * | 6/2003 | Tanabe et al. ............. 315/291 |
| 2004/0183482 A1 * | 9/2004 | Roberts et al. ............ 315/363 |
| 2006/0043911 A1 * | 3/2006 | Shao et al. ................ 315/291 |

(Continued)

*Primary Examiner* — Randy W Gibson
(74) *Attorney, Agent, or Firm* — Lowe Hauptman & Ham LLP

(57) ABSTRACT

A boost converter is provided for tracking change in input voltage. The boost converter comprises at least one input for connection to a DC voltage source for supplying an input voltage; at least one output configured to supply an output voltage having a value that is greater than a value of said input voltage by at least a predetermined offset value; feedback means adapted to provide a feedback voltage, based on said output voltage, to a switching element of said boost converter, and a feedback voltage regulator means adapted to combine said feedback voltage with an input voltage characteristic so as to adjust said output voltage to be offset and proportional to said input voltage characteristic.

13 Claims, 5 Drawing Sheets

(56) References Cited

U.S. PATENT DOCUMENTS

| | | |
|---|---|---|
| 2007/0057934 A1* | 3/2007 | Jia et al. .................. 345/211 |
| 2007/0096706 A1* | 5/2007 | Terakado et al. ........... 323/282 |
| 2008/0297069 A1* | 12/2008 | Shao et al. ................ 315/307 |
| 2010/0225250 A1* | 9/2010 | Tamegai et al. ............ 315/307 |
| 2011/0193494 A1* | 8/2011 | Gaknoki et al. ............ 315/297 |
| 2011/0215777 A1* | 9/2011 | Braylovskiy et al. ....... 323/234 |
| 2014/0167633 A1* | 6/2014 | Zhang ....................... 315/193 |
| 2014/0197739 A1* | 7/2014 | Lu ............................. 315/122 |

* cited by examiner

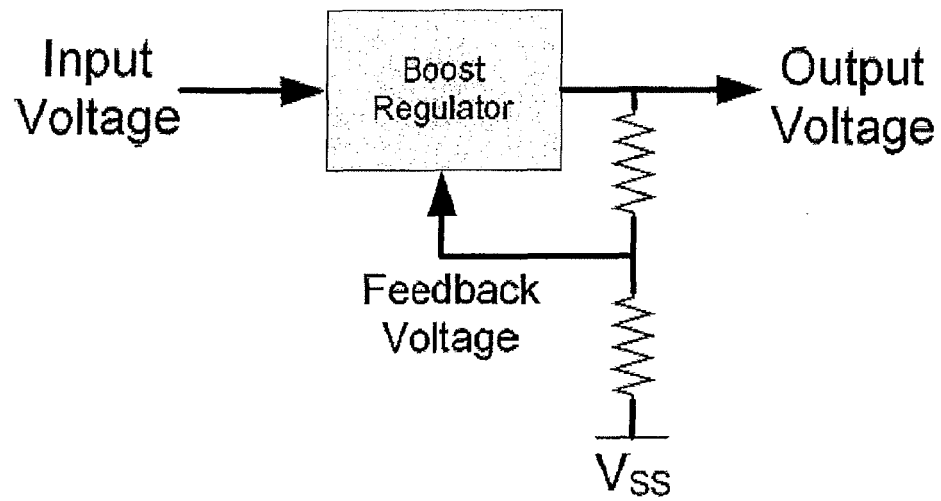
(a)
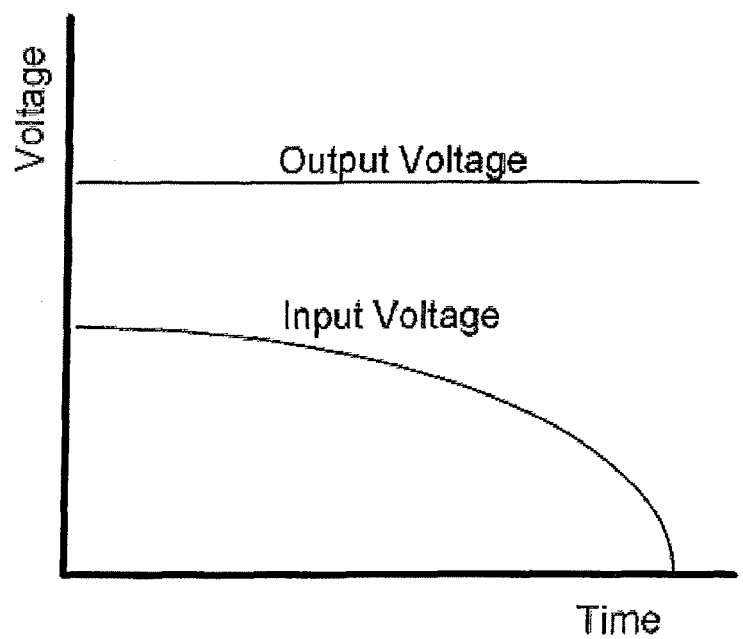
(b)
FIGURE 1 [PRIOR ART]

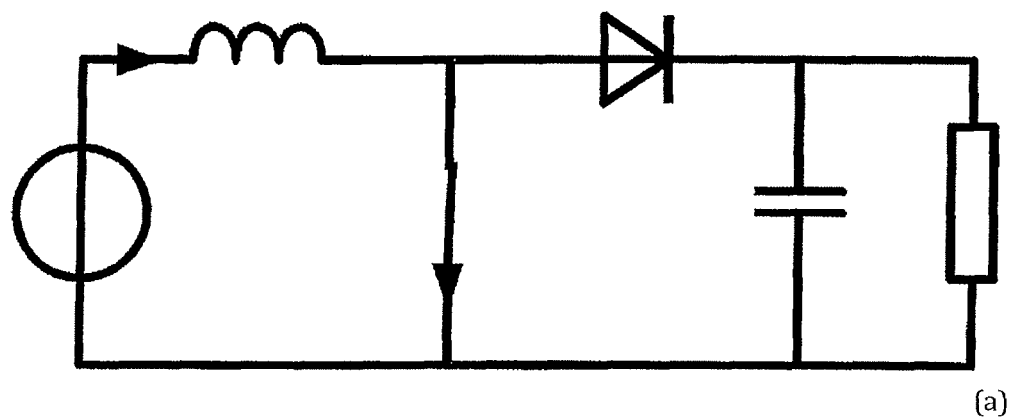
(a)
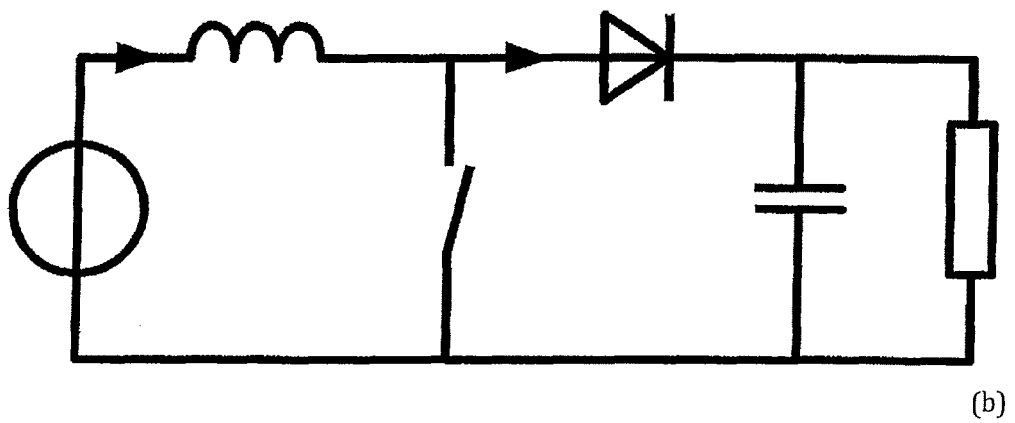
(b)
FIGURE 2 [PRIOR ART]

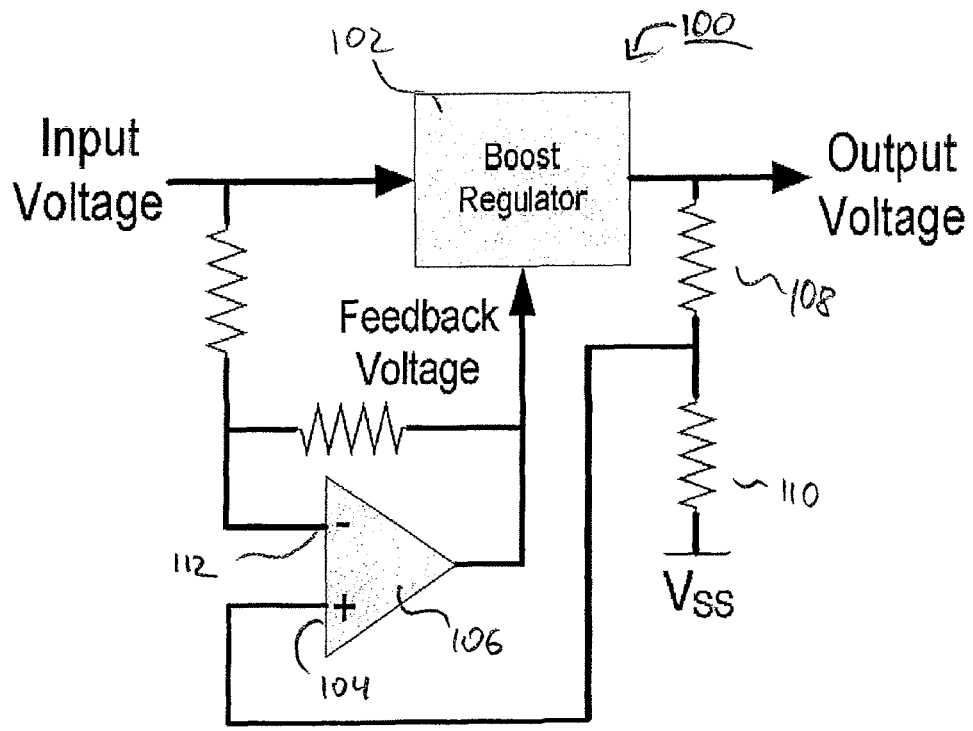
(a)
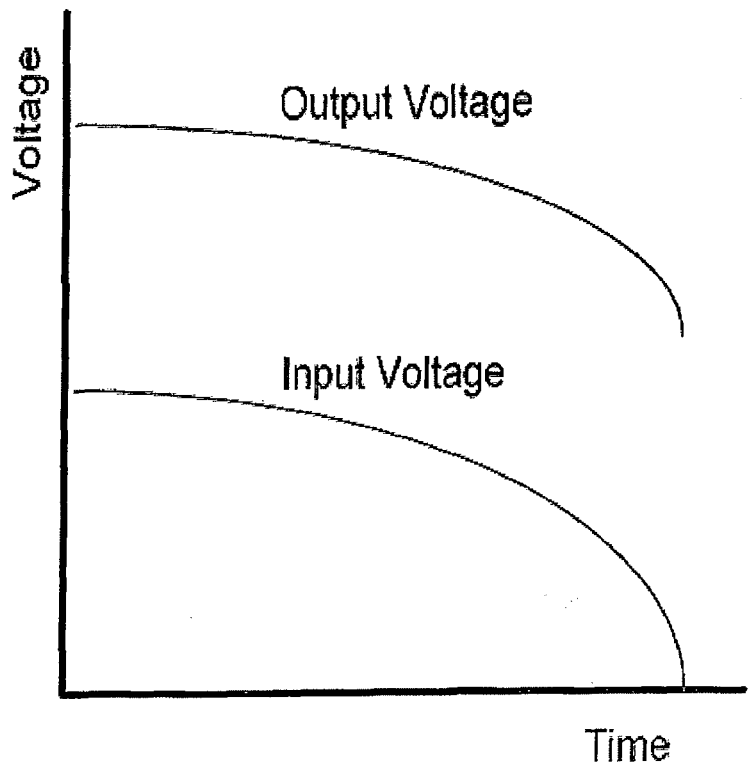
(b)
FIGURE 3

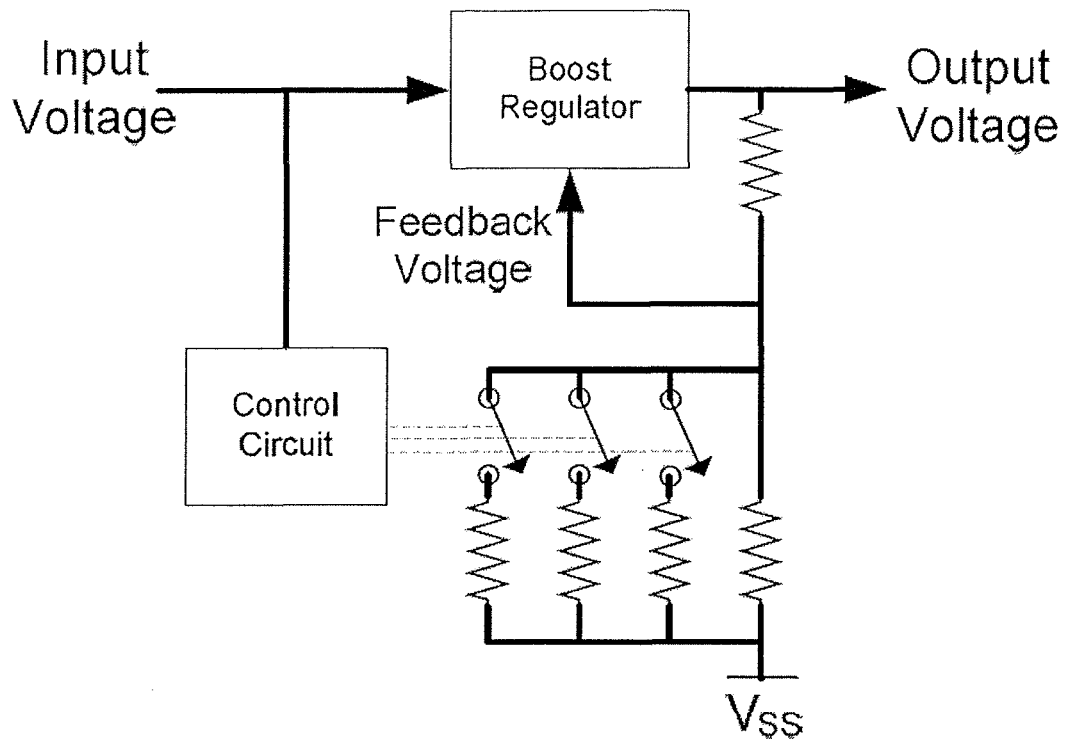
(a)
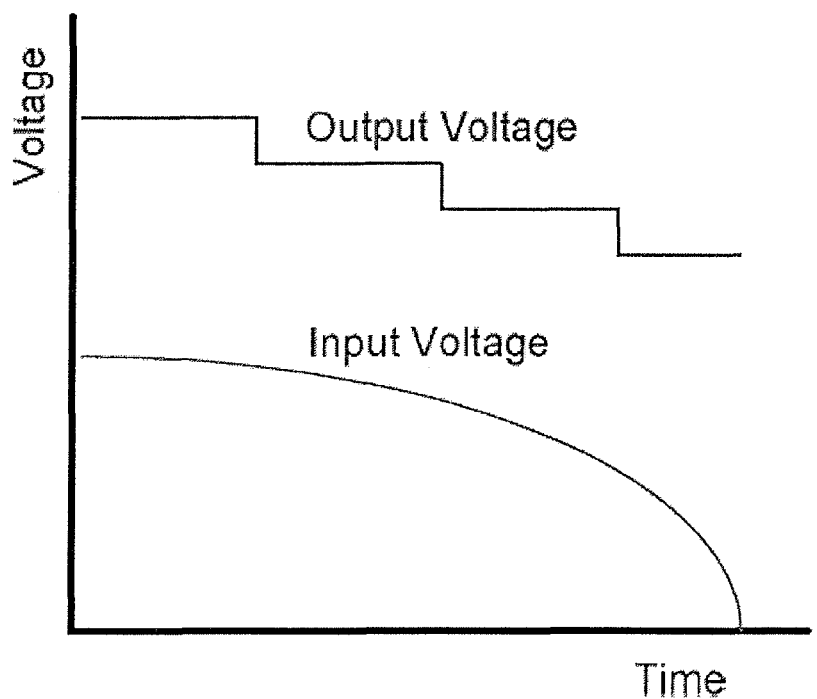
(b)
FIGURE 4

BOOST CONVERTER FOR TRACKING INPUT VOLTAGES

The present invention relates generally to the field of voltage booster circuits adapted to step up a DC power source voltage to a predetermined higher voltage, and in particular to voltage boost converters capable of reflecting a transient DC input voltage in its stepped-up output voltage. Furthermore, the present invention relates to weighing scales and weigh scale indicators having a battery power indicator.

INTRODUCTION

Weighing scales are available in many variations such as very accurate table top laboratory scales or kitchen scales, but also as heavy duty industrial freight scales or forklift scales, just to name a few, and many use a digital or analogue indicator to display the measured weight. In battery powered weighing scales, e.g. tabletop weighing scales (laboratory scales, kitchen scales), it is common practice to display the current battery charge capacity so that the user knows when he may have to replace the batteries.

Furthermore, some weigh scale indicators require, for example, a 9-36 VDC (Voltage Direct Current) input voltage in order to power them. It is also common to use a 4× Dcell Alkaline Battery Pack as power source for the weigh scale indicators. However, when using 4× Dcells connected in series, a nominal voltage of 6 VDC is generated which is less than the 9 VDC some weigh scale indicators require in order to function. Therefore, boost regulators or boost converters (also known as step-up converter) are used to convert a 3.6V to 6 VDC of the 4× Dcell input voltage to an output voltage that is higher than, for example, 9 VDC.

A typical boost regulator circuit used to step up an input voltage to a higher output voltage is shown in FIG. 1 (a) and a diagram of example input and output voltage is shown in FIG. 1 (b). FIG. 2 (a) and (b) shows a simplified circuit schematic to describe the basic principle of the boost converter. The key principle that drives the boost converter is the tendency of an inductor to resist changes in current. In a boost converter, the output voltage is always higher than the input voltage. When the switch is turned-ON, the current flows through the inductor and energy is stored within the inductor. When the switch is turned-OFF, the stored energy in the inductor tends to collapse and its polarity changes such that it adds to the input voltage. Thus, the voltage across the inductor and the input voltage are in series and together charge the output capacitor to a voltage higher than the input voltage.

However, when using boost converters to power a weigh scale indicator, it is not possible to display the battery charge capacity without adding further connections from the power source to the weigh scale indicator system. In particular, a traditional boost converter that generates a constant 12 VDC does not allow Dcell battery capacity estimation measurement, because the output of the boost switching regulator (boost converter with feedback) will maintain a constant 12 VDC output for the entire discharge voltage of the batteries.

It is currently not possible to display the battery charge capacity using currently available boost converters without adding a third connection to the cable connecting the battery pack to the weigh scale indicator and have a Power (12 VDC), Return (0 VDC) and Dcell Input Voltage wire.

Accordingly, it is an object of the present invention to provide a boost converter that is adapted to provide a boost output voltage from a transient input voltage that reflects the transient characteristics of the input voltage and which can therefore be used to display the battery charge capacity and maintain a two-wire (Power and Return) system.

SUMMARY OF THE INVENTION

Preferred embodiments of the invention seek to overcome one or more of the above disadvantages of the prior art.

According to a first aspect of the present invention, there is provided a boost converter for tracking change in input voltage comprising:

at least one input for connection to a DC voltage source for supplying an input voltage;

at least one output configured to supply an output voltage having a value that is greater than a value of said input voltage by at least a predetermined offset value;

feedback means adapted to provide a feedback voltage, based on said output voltage, to a switching element of said boost converter, and a feedback voltage regulator means adapted to combine said feedback voltage with an input voltage characteristic so as to adjust said output voltage to be offset and proportional to said input voltage characteristic.

This provides the advantage that only a two-wire connection is required to connect the power source to the weigh scale indicator via a boost converter and allowing constant tracking and/or monitoring of the battery charge capacity, reducing the number of connections (wires) needed without losing any of the required functionality and therefore saving considerable manufacturing cost. In particular, the advantage is provided by simply reflecting the transient nature of the input voltage in the boosted output voltage without compromising the required step-up Voltage offset that is necessary to power a load.

The feedback voltage regulator means may be a closed-loop operational amplifier with said input voltage characteristic connected to the inverting input, said feedback voltage connected to the non-inverting input, and an operational amplifier output connected to said switching element of said boost converter.

Using an Operational Amplifier provides the advantage that an input voltage characteristic is simply added to the feedback voltage that is connected to the switching element, therefore generating an output voltage that is proportional to the input voltage but with a predetermined DC voltage offset. The DC voltage offset therefore pushes the output voltage of the boost converter higher than the required boost voltage needed to power the weigh scale indicator while still retaining the continuous voltage discharge information.

Alternatively, the feedback voltage regulator means may be a variable output voltage divider coupled to said feedback means and adapted to adjust said feedback voltage provided to said switching element in accordance with said input voltage.

Preferably, said output voltage divider comprises a parallel circuit of a plurality of individually switchable or addable resistors. Even more preferably, said plurality of switchable resistors may be controlled by a control circuit connected to said input voltage. Advantageously, said output voltage may be adjusted in accordance with said input voltage characteristic in predetermined discrete intervals.

This provides the advantage that discrete input voltage changes can be passed onto the output voltage allowing the battery charge capacity to be displayed in predetermined intervals.

Advantageously, the offset may be at least equal to said input voltage. This provides the advantage that the output voltage will never drop below a required minimum voltage necessary to power the weigh scale indicator.

According to a second aspect of the present invention, there is provided a weigh indicator comprising a boost converter according to the first aspect of the invention.

According to a third aspect of the present invention, there is provided a weighing scale comprising a weigh scale indicator according to the second aspect of the invention.

BRIEF DESCRIPTION OF THE DRAWINGS

Preferred embodiments of the present invention will now be described, by way of example only and not in any limitative sense, with reference to the accompanying drawings, in which:

FIG. 1 (a) shows a simplified schematic of a known boost converter where the output voltage is regulated via a feedback loop, and (b) a voltage-time diagram comparing example values of input and output voltage;

FIG. 2 shows a simplified schematic circuit diagram of a boost converter in (a) its open switch state and (b) its closed switch state;

FIG. 3 shows (a) a first embodiment of the boost converter of the present invention and (b) a voltage-time diagram of input and output voltage;

FIG. 4 shows (a) a second alternative embodiment of the boost converter of the present invention adapted to provide discrete input voltage information, and (b) a voltage-time diagram of input and output voltage.

DETAILED DESCRIPTION OF THE PREFERRED EMBODIMENT(S)

Figure 5:
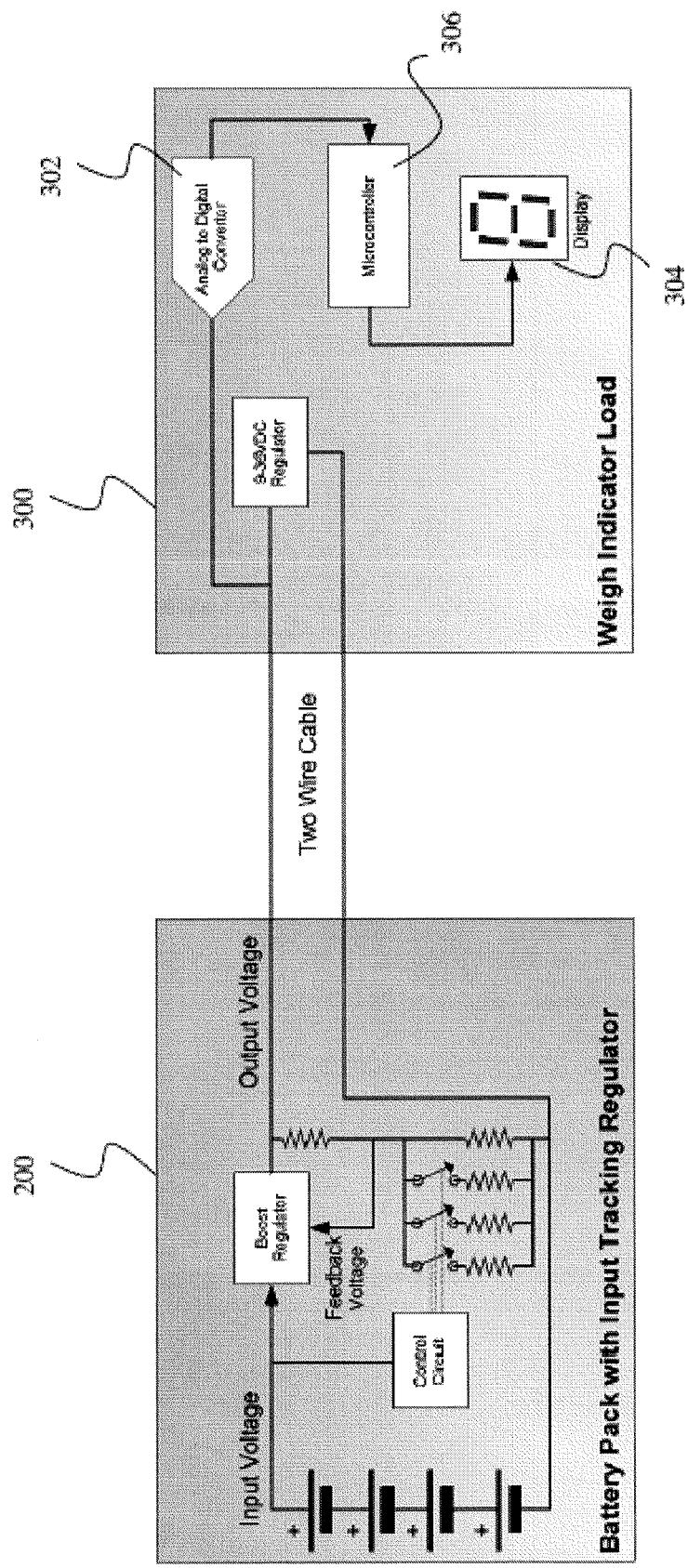
FIG. 5 shows a schematic of a weigh scale indicator system including a 4× Dcell battery pack using a boost converter according to the second embodiment of the invention allowing display of the battery charge capacity in discrete intervals.

The exemplary embodiments of this invention will be described in relation to weighing scales using digital weigh scale indicators, but it is understood that the boost converter of the present invention can be used in any other application that requires the display of a transient battery power source capacity.

Referring now to FIG. 3 (a) and (b), a first embodiment of the boost converter 100 of the present invention comprises a traditional boost regulator 102 that is adapted to, for example, boost an input voltage of 6 VDC to at least 9 VDC. A feedback of the output voltage is connected to a non-inverting input 104 of a closed-loop operational amplifier 106 via a divider of two resistors 108 and 110 being of a configuration where the resistance to current in both directions is at least approximately the same. The inverter input of the closed-loop operational amplifier 106 is connected to the input voltage of the boost converter 100. In this particular example, the input voltage characteristic is simply added to the output voltage by providing a feedback voltage reflecting the transient input voltage and output voltage to the switching element (not shown) of the boost regulator 102.

FIG. 3 (b) shows the effect of the boost converter 100 of the present invention where the output voltage is proportional to the input voltage but includes an added offset that is higher than the maximum input voltage.

Referring now to FIG. 4 (a) and (b), an alternative embodiment of the boost converter 200 of the present invention comprises a feedback path 202 through a divider 204 having a first resistor 206 and a second resistor arrangement 208 that is variable in accordance with the input voltage characteristic.

In particular, a parallel arrangement of switchable resistors 208a, 208b, 208c and 208d is controlled by a control circuit 210 which controls resistors 208a, 208b, 208c, 208d in response to a change in input voltage. For example, at a predetermined decrease (e.g. 1 VDC intervals) of the input voltage, the control circuit 210 may switch on one of the resistors 208a, 208b, 208c, 208d, changing the feedback voltage by a discrete amount which is also reflected in the output voltage (discrete step, see FIG. 4 (b)). At a continuing decreasing input voltage, additional resistors 208a, 208b, 208c, 208d may be switched on at each decreasing interval (e.g. every 1 VDC) changing the feedback voltage and output voltage, accordingly (i.e. in discrete intervals). FIG. 4(b) shows an example of the discrete steps of the output voltage following the decrease of the input voltage.

Referring now to FIG. 5, an example of the second embodiment of the boost converter 200 of the present invention supplying a weigh scale indicator 300 is shown. The boost converter 200 and the weigh scale indicator 300 are typically implemented in a weighing scale (not shown) adapted to measure a weight and display the measured weight as well as the current battery charge capacity on the weigh scale indicator 300. This setup uses a two-wire configuration having a Power (e.g. 12 VDC) and Return (e.g. 0 VDC) connection between the boost converter 200 and the weigh scale indicator 300.

The weigh scale indicator system comprising boost converter 200 and weigh scale indicator 300 may be powered by, for example, a 3.6 VDC to 6 VDC 4× Dcell battery input voltage, as shown in FIG. 5. The battery charge capacity information is taken from the boost converter 200 analogue output voltage and converted into a digital signal via an AD converter 302. The digital signal is then used to control, for example, a diode display 304 via a microcontroller 306.

It will be appreciated by persons skilled in the art that the above embodiments have been described by way of example only and not in any limitative sense, and that various alterations and modifications are possible without departing from the scope of the invention as defined by the appended claims. In particular, it would be understood that any suitable known boost converter (i.e. boost regulator, step-up converter etc) may be retrofitted to provide an output voltage according to the present invention.

The invention claimed is:

1. A boost converter for tracking change in input voltage comprising:
   at least one input for connection to a DC voltage source for supplying an input voltage;
   at least one output configured to supply an output voltage having a value that is greater than a value of said input voltage by at least a predetermined offset value;
   feedback means adapted to provide a feedback voltage, based on said output voltage, to a switching element of said boost converter;
   a feedback voltage regulator means adapted to combine said feedback voltage with an input voltage characteristic so as to adjust said output voltage to be offset and proportional to said input voltage characteristic,
     wherein the boost converter is configured such that the feedback voltage is fed to a non-inverting input of a closed-loop operational amplifier via a divider of two resistors, the resistors being of a configuration where the resistance to current in both directions is at least approximately the same, and an inverter input of the closed-loop operational amplifier is connected to the input voltage, and wherein the inverting input of said closed-loop operational amplifier is coupled to said input voltage.

2. A boost converter according to claim 1, wherein said feedback voltage regulator means is a closed-loop operational amplifier with said input voltage characteristic connected to the inverting input, said feedback voltage connected to the non-inverting input, and an operational amplifier output connected to said switching element of said boost converter.

3. A boost converter for tracking change in input voltage comprising:
 at least one input for connection to a DC voltage source for supplying an input voltage;
 at least one output configured to supply an output voltage having a value that is greater than a value of said input voltage by at least a predetermined offset value;
 feedback means adapted to provide a feedback voltage, based on said output voltage, to a switching element of said boost converter;
 a feedback voltage regulator means adapted to combine said feedback voltage with an input voltage characteristic so as to adjust said output voltage to be offset and proportional to said input voltage characteristic,
 wherein said feedback voltage regulator means is a variable output voltage divider coupled to said feedback means and adapted to adjust said feedback voltage provided to said switching element in accordance with said input voltage.

4. A boost converter according to claim 3, wherein said output voltage divider comprises a parallel circuit of a plurality of individually switchable resistors.

5. A boost converter according to claim 4, wherein said plurality of switchable resistors are controlled by a control circuit connected to said input voltage.

6. A boost converter according to claim 3, wherein said output voltage is adjusted in accordance with said input voltage characteristic in predetermined discrete intervals.

7. A boost converter according to claim 1, wherein said offset is at least equal to said input voltage.

8. A weigh indicator comprising:
 a boost converter according to claim 3.

9. A weighing scale system comprising a weigh scale indicator according to claim 8.

10. A weigh indicator according to claim 8, wherein the weigh indicator is configured to track a change in the input voltage.

11. A boost converter according to claim 1, the boost converter is configured to add an input voltage characteristic to an output voltage characteristic by providing the feedback voltage to the switching element.

12. A boost converter according to claim 3, the boost converter is configured such that the feedback voltage reflects a transient input voltage and output voltage.

13. A boost converter according to claim 1, wherein the boost converter is configured such that the feedback voltage is fed to a non-inverting input of a closed-loop operational amplifier via a divider of two resistors, and an inverter input of the closed-loop operational amplifier is connected to the input voltage, wherein the boost converter is configured to add an input voltage characteristic to an output voltage characteristic by providing the feedback voltage top the switching element, wherein the feedback voltage reflects a transient input voltage and output voltage.

* * * * *